United States Patent [19]

Orlowski

[11] Patent Number: 4,466,620
[45] Date of Patent: Aug. 21, 1984

[54] SEALING RINGS

[76] Inventor: David C. Orlowski, 2901 106th Ave. West, Milan, Ill. 61264

[21] Appl. No.: 448,186

[22] Filed: Dec. 27, 1982

[51] Int. Cl.³ .............................................. F16J 15/44
[52] U.S. Cl. .................................................... 277/53
[58] Field of Search .................................... 277/53-57

[56] References Cited

U.S. PATENT DOCUMENTS

| | | | |
|---|---|---|---|
| 1,168,002 | 1/1916 | Hirth | 277/53 |
| 1,458,684 | 6/1923 | Cook | 277/57 |
| 1,978,739 | 10/1934 | Brittain | 277/57 |
| 3,663,023 | 5/1972 | Leidenfrost | 277/56 |
| 3,893,674 | 7/1975 | Paradine | 277/56 |
| 4,022,479 | 5/1977 | Orlowski | 277/53 |
| 4,114,902 | 9/1978 | Orlowski | 277/53 |

*Primary Examiner*—Robert I. Smith
*Attorney, Agent, or Firm*—Y. Judd Azulay

[57] ABSTRACT

Sealing rings of the type comprising a first ring member and a second ring member. The first ring member has an external radially extending face, an internally radially extending face, an inner axially extending face, and an outer axially extending face. The inner axially extending face has a series of internal labyrinth annular grooves and an axially extending groove joining the internal labyrinth annular grooves and opening to the external radially extending face. The internal radially extending face has an axially extending first annular recess having parallel inwardly radially facing and outwardly radially facing walls.

The second ring member has an axially extending first annular flange having an outwardly facing portion and an inwardly facing portion adapted and constructed to be complementary with the recess.

The sealing rings are improved in that they further comprise at least one of the following characteristics:
a. Each of the internal labyrinth annular grooves is deeper than its adjacent groove located on the internal radially extending face side thereto;
b. A portion of the external radially extending face is axially extended; or
c. The external radially extending face of the first ring member has an axially extending second annular flange having parallel outwardly facing and inwardly facing portions and the second ring member has an axially extending second annular recess adapted and constructed to be complementary with the second flange.

31 Claims, 3 Drawing Figures

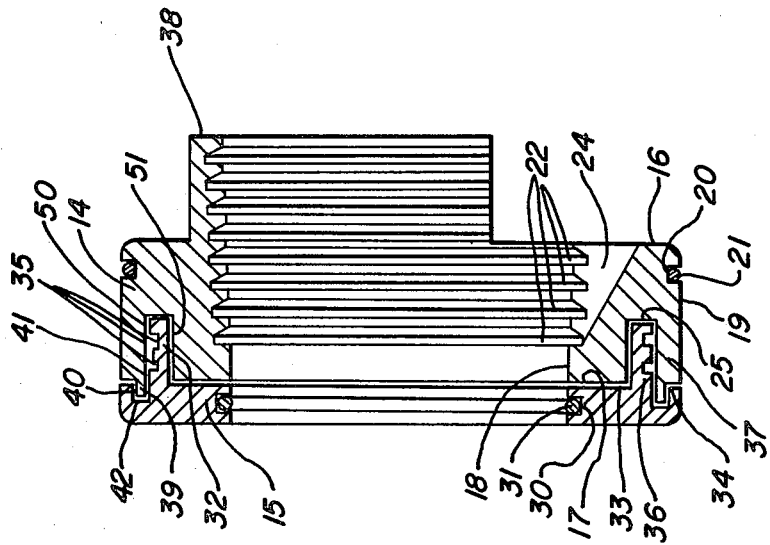
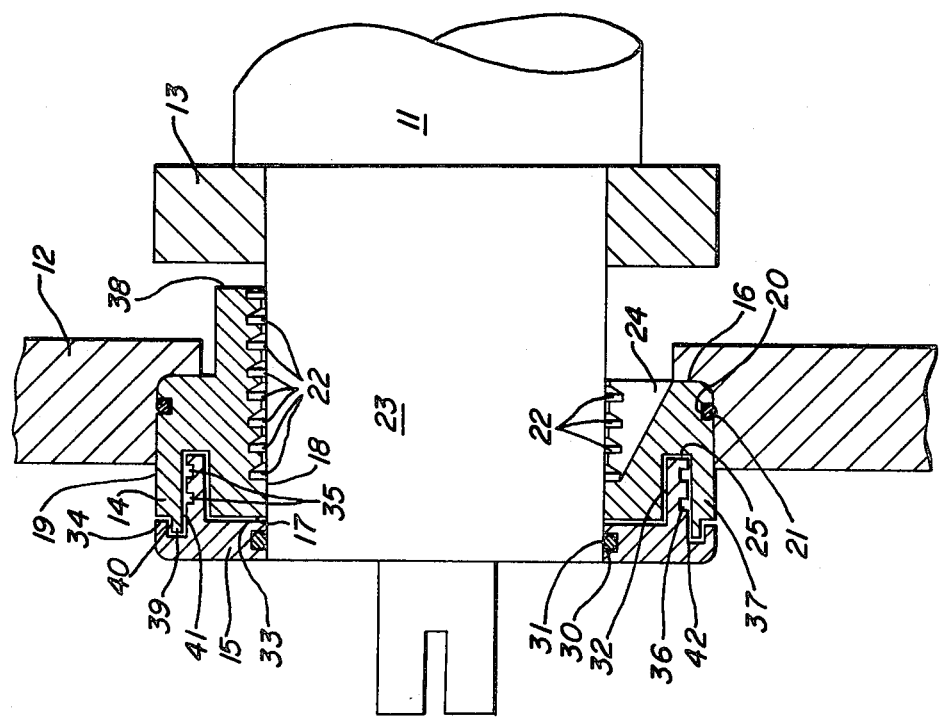

SEALING RINGS

BACKGROUND OF THE INVENTION

The present invention is deemed to be a considerable and meritorious improvement over the inventions disclosed in U.S. Pat. No. 4,022,479, and U.S. Pat. No. 4,114,902.

It bears reiteration at this juncture to state that in most industries, it is extremely important that there be provided a seal for bearings that supports rotating shafts which prevent the lubricants associated with the bearings from leaking externally of an associated housing or bearing support and for preventing foreign particles in the environment while the shaft is being used from working themselves through the seal and into the lubricant for the bearings.

U.S. Pat. No. 4,022,479 incorporates a disclosure wherein there is taught a sealing ring structure which has as an object, the elimination the movement of the lubricant from the bearings outside of the housing. The sealing ring structure as disclosed, also assists in eliminating the movement of foreign particles into the bearing area and lubricant area within the housing.

It was therein disclosed a sealing structure that is composed of two rings, preferably metal, one of which is fixed to the housing and the other of which is fixed to rotate with the shaft. The ring that is fixed to the housing has a labyrinth-type of seal against the shaft which discourages the lubricant from moving outside of the housing along the shaft. In U.S. Pat. No. 4,022,479, a joint was provided between the two rings which is composed of an annular recess in the first ring that opens axially outwardly of the housing and an annular flange on the adjoining outer ring that fits within the aforementioned annular recess of the first ring. The construction of the annular recess and the annular flange were said to be constructed so that the two bearing rings that are rotating relative to one another, will tend not to bind or create a heated frictional disposition between them. There was also provided in the first sealing ring a hole that communicates to the aforementioned recess. In the embodiment taught in this prior patent, the annular flange of the second sealing ring had notches cut therein. With such an arrangement, foreign particles that moved into the joint formed by the recess and flanges were scraped by the notches in the flanges to the hole where they were discharged back into the atmosphere or the area surrounding the housing. It will be noted that the first ring is, of course, fixed to the housing and the second ring is, of course, adapted to rotate with the shaft by suitable sealing means. However, in both instances, there is no movement between the respective sealing rings and the portion it is fixed to which would normally create wear if the opposite occurred.

The invention of U.S. Pat. No. 4,114,902 was an ingenious improvement over the device disclosed in U.S. Pat. No. 4,022,479. The improvement, among other items included the use of at least one groove on the mating flange with respect to the recess on the other complementary ring. Additionally, the inwardly facing wall of the recess also contained at least one groove. It was noted in U.S. Pat. No. 4,114,902 that these grooves act to inhibit particle migration, regardless of relative peripheral speed of the rotating rings and provide a circumferential path for the exclusion of foreign particles even in the event of zero relative rotation.

Although the above advances have solved a great number of problems, a few problems are still encountered in various particular work applications. For example, liquid lubricants (particularly synthetics) that astringently adhere to the rotating bearing shaft are problematic. In addition, difficulties arise when large quantities of liquid lubricants are propelled at the shaft/stator ring junction as is the case with double reduction gearing as well as pinion and gear interface in speed reduction gearing. Lastly, axially displacement of a round expulsion orifice, located on the radially exterior surface of the first ring and radially communicating with the annular recess, is occassionally rendered ineffective due to the relative axial displacement of the two rings.

Accordingly, it would be highly desirable to have a sealing ring structure that eliminates these residual problems.

SUMMARY OF THE INVENTION

The prevention of the present matter is a further ingenious improvement over the devices disclosed in the aforementioned patents and solves the above residual problems. The present improvement, among other items, includes a modification of the labyrinth-type seal wherein each annular groove thereof is deeper than the labyrinth annular groove located outwardly of the housing with respect thereto. This improvement enables the first ring member to more efficiently scavenge liquid lubricants (particularly synthetics) that astringently adhere to the rotating bearing shaft. This improvement is also very effective for use in situations, e.g. double reduction gearing, wherein large quantities of liquid lubricants are propelled at the shaft—first ring junction.

Another improvement of the present invention is a modification of the hole in the first sealing ring. The hole is modified such that its axially extending length is greater than its circumferentially extending width. This improvement eliminates expulsion problems which occassionally arise due to relative axial displacement of the sealing rings.

The instant invention also encompasses an additional improvement wherein a portion of the first ring that faces a bearing located inside the housing is axially extended to form a shielding protrusion. This inprovement wards off the profuse quantities of liquid lubricant that are continuously directed at the shaft—first ring interface in certain situations, e.g. pinion and gear reduction gearing.

Still other features, and attendant advantages of the present invention will become apparent to those skilled in the art from a reading of the following detailed description of the preferred embodiments, taken in conjunction with the accompanying drawings wherein like numerals designate like parts in the several figures.

BRIEF DESCRIPTION OF THE DRAWING

FIG. 1 is a vertical sectional view showing the improved sealing structure with a ball bearing shaft.

FIG. 2 is a vertical sectional view showing the improved sealing structure.

DESCRIPTION OF THE PREFERRED EMBODIMENT

Figure 3:
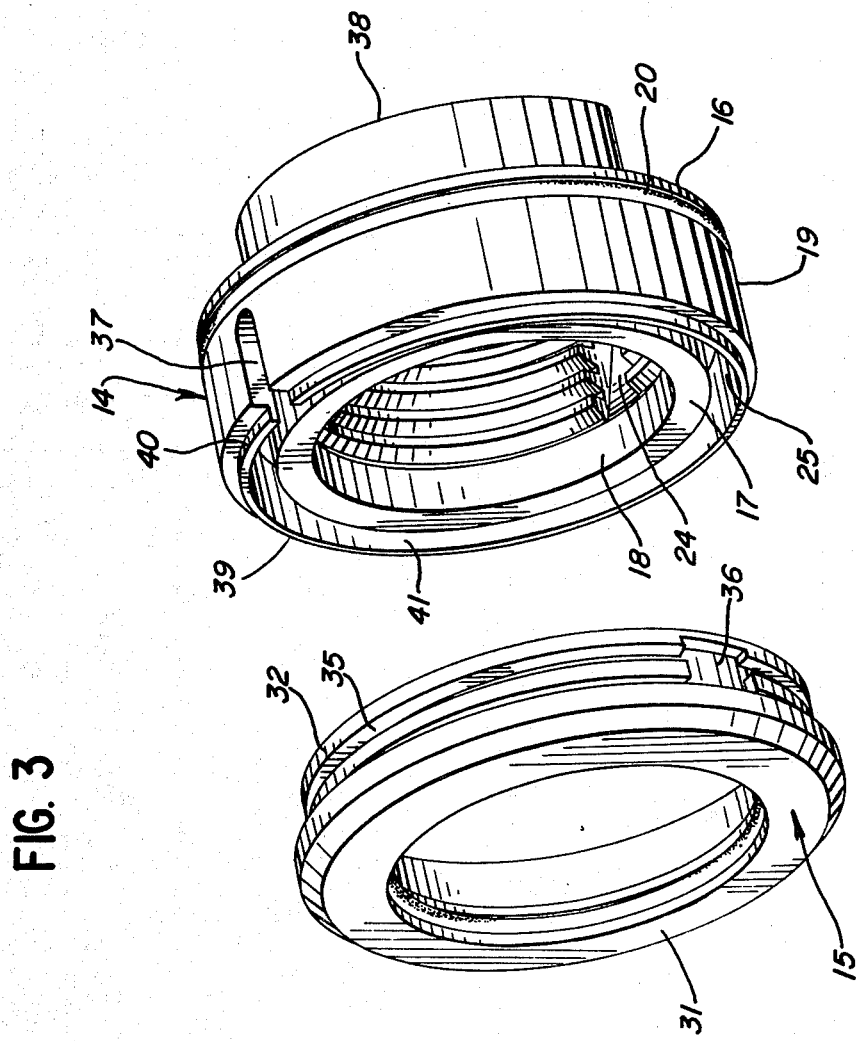
FIG. 3 is an exploded perspective view of the parts of the sealing rings of the present invention.

Referring first to FIG. 1, there is shown an arrangement in which the sealing structure of the present invention may be employed. There is shown the sealing rings of the present invention in vertical cross-section mounted on a shaft 11. The shaft is provided with a bearing housing 12. Conventional race with ball bearings, shown schematically as 13, is conventionally journalled to the shaft 11. Conventional means is provided to provide lubricant to the race. More details of this feature can be discerned from the aforementioned U.S. Pat. No. 4,022,479, which is herein incorporated by reference.

In order to prevent leakage of the lubricant from inside the housing 12 outwardly and the leakage of foreign particles from outside the housing into the bearings or lubricant, there is provided a sealing ring structure composed of a first ring 14 and a mating second ring 15. The first ring 14 has an external radially extending face 16, an internal radially extending face 17, an inner axially extending face 18, and an outer axially extending face 19. The first ring 14 also possesses an external annular groove 20 in which seats a conventional O-ring 21 that bears against a complementary circular opening in the housing 12. The first ring 14 is secured against rotation with respect to the housing 12 by a swedge fit with respect thereto. Inwardly extending radial grooves 22 are provided on the inner surface 18 of the first ring 14 and provide radial shoulders which engage lubricant tending to move axially outwardly along the shaft portion 23 and to guide it into an axially extending groove 24 on the inside 18 of the first ring 15. The groove 24 joins together the annular grooves 22 to carry the lubricant caught in the grooves 22 back into the housing 12.

The internal end 17 of the first ring 14 is provided with an annular recess 25 that extends axially from the said internal end 17 and serves one part of the joint with the second ring 15. The annular recess 25 has an inwardly radially facing wall 50 and an outwardly radially facing wall 51. The second ring 15 fits around the shaft portion 23 and possesses an internal annular groove 30 that is fitted with a conventional O-ring 31. The frictional engagement of the O-ring 31 between the second ring 15 and the shaft portion 23 causes the second ring 16 to be fixed to rotate with the shaft 23. The O-ring also limits axial movement of the second ring 15 on the shaft portion 23. Furthermore, the second ring is provided with an annular flange 32 that is complementary to and fits within the aforementioned axial recess 25. The flange 32 extends axially from inner and outer radial faces 33 and 34 that are positioned alongside the internal end 17 of the first ring 14.

The annular flange 32 is provided with a pair of outwardly radially extending grooves 35, each having walls and a bottom perpendicular to one another. Additionally, on the same radially outwardly extending surface possessing the groove 35, there is provided at least one depression 36 that is sufficiently large to connect each of the two grooves 35. Preferably, a diametrically opposite pair of such depressions 36 are provided.

A hole of 37 is provided externally of the first ring 14 which extends to the recess 25. Preferably, the hole has an axially extending length greater than its circumferentially extending width. This preferred embodiment eliminates expulsion problems which occassionally arise due to relative axial displacement of the two sealing rings, 14 and 15.

It should also be known that the radial dimension of the flange 32 is from 0.005 inches to 0.015 inches smaller than the radial dimension of the recess 25. Consequently, the second ring 15 is permitted to rotate within the recess with practically zero friction between the respective surfaces.

In a preferred embodiment of the sealing rings of this invention each of such radial grooves 22 is deeper than the adjacent groove located on the internal end 17 side thereof. This improvement enables the first ring 14 to more efficiently scavenge liquid lubricants (particularly synthetics) that astringently adhere to the rotating bearing shaft. This improvement is also very effective for use in situations, e.g., double reduction gearing, wherein large quantities of liquid lubricants are propelled at the shaft 23—first ring 14 junction.

In another preferred embodiment of the instant invention, a portion 38 of the external radially extending face 16 is axially extended to form a shielding protrusion. Preferably, the axially extended portion 38 comprises at least 50, more preferably from about 60 to about 70, and optimally about 75, percent of the external, radially extending face 16. It is also preferred that this axially extended portion 38 be located opposite the axially extending groove 24. This improvement further wards off the profuse quantities of liquid lubricant that are continuously directed at the shaft 23—first ring 14 interface in certain situations, e.g., pinion and gear reduction gearing.

The improved sealing rings of this invention have an additional preferred embodiment wherein the internal radially extending face 17 is provided with an axially extending second annular flange 39 that serves as one part of a joint with second ring 15. The second annular flange has parallel outwardly facing and inwardly facing portions, 40 and 41, respectively. Furthermore, the second ring 15 is provided with an annular recess 42 that extends axially and is complementary to and fits over the aforementioned second annular flange 39. It is further preferred that the inwardly radially facing wall 50 of the first annular recess 25 and the inwardly facing portion 41 of the second annular flange 39 lie in a common plane.

It should similarly be known that the radial dimension of the second annular flange 39 is from 0.005 inches to 0.015 inches smaller than the radial dimension of the second recess 42. Consequently, the second ring 15 is permitted to rotate over the second flange 39 with practically zero friction between the respective surfaces while having yet another feature adapted to further prevent the lubricants associated with bearings from leaking externally of housing 12 as well as to further prevent foreign particles from working themselves into the housing 12 and into the lubricant for the bearings 13.

The grooves in the inwardly radially facing wall disclosed in U.S. Pat. No. 4,114,902, which is incorporated by reference, at column 3, lines 15 et seq. can optionally be employed herein.

As was mentioned in the issued patents, that while O-rings are provided for seals, there is little or no relative rotation between the sealing surfaces of the O-rings. Therefore, the O-rings should not wear and the possibility of breaking the seal is remote.

Based on this disclosure, many other modifications and ramifications will naturally suggest themselves to those skilled in the art. These are intended to be comprehended as within the scope of this invention.

The embodiments of the present invention in which an exclusive property or privilege is claimed are defined as follows:

1. Sealing rings of the type comprising:
   a. A first ring member;
   b. A second ring member;
   c. Said first ring member having an external radially extending face, internal radially extending face, an inner axially extending face, and an outer axially extending face;
   d. Said inner axially extending face having a series of internal labyrinth annular grooves and an axially extending groove joining said internal labyrinth annular grooves and opening to said external radially extending face;
   e. Said internal radially extending face having an axially extending first annular recess having parallel inwardly radially facing and outwardly radially facing walls;
   f. Said second ring member having an axially extending first annular flange having an outwardly facing portion and an inwardly facing portion adapted and constructed to be complementary with said recess;
   characteristic in that each of said internal labyrinth annular grooves is deeper than its adjacent groove located on the internal radially extending face side with respect thereto.

2. The sealing rings of claim 1 further characterized by said first ring member having an opening on said outer axially extending face, said opening communicating radially and inwardly with said axially extending first annular recess.

3. The sealing rings of claim 2 further characterized by said first flange having at least one annular groove along the outwardly facing portion.

4. The sealing rings of claim 3 wherein said first flange has two of said annular grooves and at least one depression is located on said first flange to thereby connect said grooves.

5. The sealing rings of claim 2 further characterized in that said opening has an axially extending length greater than its circumferentially extending width.

6. The sealing rings of claim 1 further characterized in that a portion of said external radially extending face is axially extended.

7. The sealing rings of claim 6 wherein said axially extended portion comprises at least 50 percent of said external radially extending face.

8. The sealing rings of claim 7 wherein said axially extended portion comprises from about 60 to about 70 percent of said external radially extending face.

9. The sealing rings of claim 6 wherein said axially extended portion is opposite said axially extending groove.

10. The sealing rings of claim 1 further characterized in that said internal radially extending face has an axially extending second annular flange having parallel outwardly facing and inwardly facing portions and said second ring member has an axially extending second annular recess adapted and constructed to be complementary with said second flange.

11. Sealing rings of the type comprising:
   a. A first ring member;
   b. A second ring member;
   c. Said first ring member having an external radially extending face, an internal radially extending face, an outer axially extending face;
   d. Said inner axially extending face having a series of internal labyrinth annular grooves and an axially extending groove joining said internal labyrinth annular grooves and opening to said external radially extending face;
   e. Said internal radially extending face having an axially extending first annular recess having parallel inwardly radially facing, and outwardly radially facing walls;
   f. Said second ring member having an axially extending first annular flange having an outwardly facing portion and an inwardly facing portion adapted and constructed to be complementary with said recess;
   characterized in that a portion of said external radially extending face is axially extended.

12. The sealing rings of claim 11 further characterized by said first ring member having an opening on said outer axially extending face, said opening communicating radially and inwardly with said axially extending first annular recess.

13. The sealing rings of claim 12 further characterized by said first flange having at least one annular groove along the outwardly facing portion.

14. The sealing rings of claim 13 wherein said first flange has two of said annular grooves and at least one depression is located on said first flange to thereby connect said grooves.

15. The sealing rings of claim 12 further characterized in that said opening has an axially extending length greater than its circumferentially extending width.

16. The sealing rings of claim 11 wherever said axially extended portion comprises at least 50 percent of said external radially extending face.

17. The sealing rings of claim 16 wherein said axially extended portion comprises from about 60 to about 70 percent of said external radially extending face.

18. The sealing rings of claim 11 wherever said axially extended portion is opposite said axially extending groove.

19. The sealing rings of claim 11 further characterized in that said internal radially extending face has an axially extending second annular flange having parallel outwardly facing and inwardly facing portions and said second ring member has an axially extending second annular recess adapted and constructed to be complementary with said second flange.

20. Sealing rings of the type comprising:
   a. A first ring member;
   b. A second ring member;
   c. Said first ring member having an external radially extending face, an internal radially extending face, an inner axially extending face, and an outer axially extending face;
   d. Said inner axially extending face having a series of internal labyrinth annular grooves and an axially extending groove joining said internal labyrinth annual grooves and opening to said external radially extending face;
   e. Said internal radially extending face having an axially extending first annular recess having parallel inwardly radially facing and outwardly radially facing walls;
   f. Said second ring member having an axially extending first annular flange having an outwardly facing portion and an inwardly facing portion adapted and constructed to be complementary with said recess;

characterized in that said external radially extending face of said first ring member has an axially extending second annular flange having parallel outwardly facing and inwardly facing portions and said second ring member has an axially extending second annular recess adapted and constructed to be complementary with said second flange.

21. The sealing rings of claim 20 further characterized by said first ring member having an opening on said outer axially extending face, said opening communicating radially and inwardly with said axially extending first annular recess.

22. The sealing rings of claim 21 further characterized by said first flange having at least one annular groove along the outwardly facing portion.

23. The sealing rings of claim 22 wherein said first flange has two of said annular grooves and at least one depression is located on said first flange to thereby connect said grooves.

24. The sealing rings of claim 21 further characterized in that said opening has an axially extending length greater than its circumferentially extending width.

25. The sealing rings of claim 20 further characterized in that a portion of said external radially extending face of said first ring member is axially extended.

26. The sealing rings of claim 25 wherein said axially extended portion comprises at least 50 percent of said external radially extending face.

27. The sealing rings of claim 26 wherein said axially extended portion comprises from about 60 to about 70 percent of said external radially extending face.

28. The sealing rings of claim 20 wherein said axially extended portion is opposite said axially extending groove.

29. The sealing rings of claim 20 further characterized in that:
a. Each of said internal labyrinth annular grooves is deeper that its adjacent groove located on the internal radially extending face side with respect thereto;
b. Said first ring member having an opening on said outer axially extending face, said opening communicating radially and inwardly with said axially extending first annular recess;
c. Said first flange having at least one annular groove along the outwardly facing portion;
d. Said opening has an axially extending length greater than its circumferentially extending width; and
e. A portion of said external radially extending face of said first ring member is axially extended.

30. The sealing rings of claim 29 wherein:
a. Said first flange has two of said annular grooves and at least one depression is located on said first flange to thereby connect said grooves;
b. Said axially extended portion comprises at least 50 percent of said external radially extending face; and
c. Said axially extended portion is opposite said axially extending groove.

31. The sealing rings of claim 30 wherein said inwardly radially facing all of said first annular recess and said inwardly facing portion of said second annular flange lie in a common place.

* * * * *

REEXAMINATION CERTIFICATE (821st)
United States Patent [19]
Orlowski

[11] B1 4,466,620
[45] Certificate Issued  Mar. 15, 1988

[54] SEALING RINGS

[76] Inventor: David C. Orlowski, 2901 106th Ave. West, Milan, Ill. 61264

Reexamination Request:
No. 90/000,967, Mar. 13, 1986

Reexamination Certificate for:
Patent No.: 4,466,620
Issued: Aug. 21, 1984
Appl. No.: 448,186
Filed: Dec. 27, 1982

[51] Int. Cl.⁴ .............................................. F16K 15/44
[52] U.S. Cl. ........................................ 277/53; 277/68; 277/133
[58] Field of Search ..................... 277/53–57, 277/67, 68, 69, 134, 25, 214, 215, 133

[56] References Cited
U.S. PATENT DOCUMENTS

| | | | |
|---|---|---|---|
| 1,168,002 | 1/1916 | Hirth | 277/53 X |
| 1,458,684 | 6/1923 | Cook | 277/57 X |
| 1,978,739 | 10/1934 | Brittain, Jr. | 277/57 X |
| 3,532,399 | 10/1970 | Gray | 277/53 X |
| 3,558,238 | 1/1971 | VanHerpt | 277/53 |
| 3,663,023 | 5/1972 | Leidenfrost | 277/56 |
| 3,865,504 | 2/1975 | Benz | 277/53 X |
| 3,893,674 | 7/1975 | Paradine | 277/56 |
| 4,022,479 | 5/1977 | Orlowski | 277/53 |
| 4,114,902 | 9/1978 | Orlowski | 277/53 |

FOREIGN PATENT DOCUMENTS

| | | |
|---|---|---|
| 2035472 | 6/1980 | United Kingdom . |
| 1574253 | 9/1980 | United Kingdom . |
| 1605060 | 12/1981 | United Kingdom . |

*Primary Examiner*—Allan N. Shoap
*Attorney, Agent, or Firm*—Y. Judd Azulay; Roderick F. Mollison

[57] ABSTRACT

Sealing rings of the type comprising a first ring member and a second ring member. The first ring member has an external radially extending face, an internally radially extending face, an inner axially extending face, and an outer axially extending face. The inner axially extending face has a series of internal labyrinth annular grooves and an axially extending groove joining the internal labyrinth annular grooves and opening to the external radially extending face. The internal radially extending face has an axially extending first annular recess having parallel inwardly radially facing and outwardly radially facing walls.

The second ring member has an axially extending first annular flange having an outwardly facing portion and an inwardly facing portion adapted and constructed to be complementary with the recess.

The sealing rings are improved in that they further comprise at least one of the following characteristics:

a. Each of the internal labyrinth annular grooves is deeper than its adjacent groove located on the internal radially extending face side thereto;
b. A portion of the external radially extending face is axially extended; or
c. The [external] *internal* radially extending face of the first ring member has an axially extending second annular flange having parallel outwardly facing and inwardly facing portions and the second ring member has an axially extending second annular recess adapted and constructed to be complementary with the second flange.

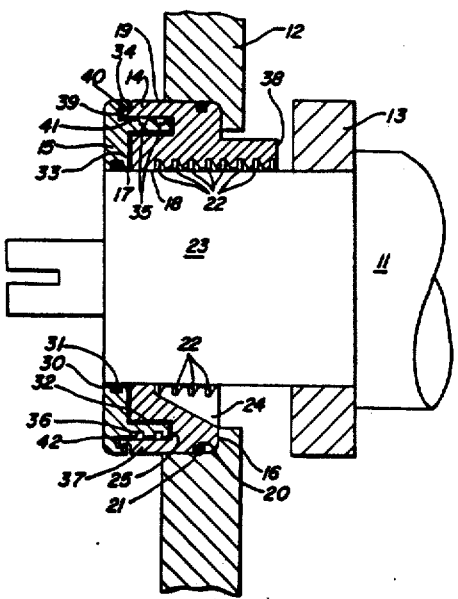

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 46-53:
The instant invention also encompasses an additional improvement wherein a portion of the first ring that faces a bearing located inside the housing is axially extended to form a shielding protrusion. This improvement wards off the profuse quantities of liquid lubricant that are continuously directed at the shaft—first ring interface in certain situations, e.g. pinion and gear reduction gearing. *The shielded portion is achieved by providing an arcuate portion extending from the end of the first ring member nearest the bearing to that part of the first ring member attached to the housing. Preferably the arcuate portion will be of a lesser diameter and will have some portion of the extension removed in an axial direction to form an arcuate cover or shield over the top of the rotating shaft.*

Column 3, line 64-column 4, line 2:
A hole [of] 37 is provided externally of the first ring 14 which extends to the recess 25. Preferably, the hole has an axially extending length greater than its circumferentially extending width. This preferred embodiment eliminates expulsion problems which occassionally arise due to relative axial displacement of the two sealing rings, 14 and 15.

AS A RESULT OF REEXAMINATION, IT HAS BEEN DETERMINED THAT:

Claims 1-31 are cancelled.

New claims 32-34 are added and determined to be patentable.

32. *A sealing ring for placement about a shaft extending through a housing and a bearing assembly means and of the type comprising:*
   (a) *a first ring member;*
   (b) *a second ring member;*
   (c) *said first ring member having at one end thereof an external face adjacent the bearing assembly means and supported by a wall of the housing extending in a radial direction generally perpendicular to the shaft centerline, the bearing assembly means being within said housing;*
   (d) *said first ring member having an outermost internal mating face facing in the opposite direction to said external face and at a second end of said first ring member opposite said one end and generally perpendicular to the shaft centerline;*
   (e) *said first ring member having an inner substantially cylindrical face extending axially with respect to the shaft centerline to provide a bore or opening in the first ring member through which the shaft may pass; said inner face along any point on any line perpendicular to said centerline being at a first radius;*
   (f) *said first ring member having an outer face extending generally parallel to the shaft centerline and comprising a perimetrical outer surface, a part of said perimetrical outer surface providing contact between said outer face and said housing for supporting said first ring member, said perimetrical outer surface having an opening extending radially therethrough to an annular recess, said annular recess extending through said internal mating face and axially into said first ring member at said second end;*
   (g) *said inner face having a series of annular grooves substantially perpendicular to the shaft and a trough interrupting said annular grooves so that said annular grooves are absent at said trough, said trough extending from the beginning of said annular grooves located closest to said outermost internal facing surface and thereafter sloping radially outwardly and axially to a third end of said first ring member facing in the same direction as said external face, said third end located between said one and said second end;*
   (h) *said second ring member having at one end thereof an internal mating face generally perpendicular to the shaft centerline extending in a radial direction complementary with the outmost internal mating face of said first ring member;*
   (i) *said second ring member having an outermost external face extending in a radial direction generally perpendicular to the shaft centerline and facing in the same direction as said outermost internal mating face of said first ring member;*
   (j) *said second ring member having an inner face generally parallel to the shaft centerline to provide an opening for the shaft to pass through and including means so that said second ring member can be supported by the shaft;*
   (k) *said second ring member having an outer face extending generally parallel to the shaft centerline;*
   (l) *said second ring member having an axially extending annular flange located at the internal mating face of said second ring member and extending into and complementary with said annular recess of said first ring member;*
   (m) *said first ring member having an arcuate extension located axially between said third end and said one end of said first ring member, said arcuate extension having its arcuate extent bounded by two side edges, said arcuate extension having an inner substantially cylindrical surface having the same radius as said first radius so that said inner surface is an arcuate extension of said inner face; said inner surface having arcuate grooves therein extending from one of said two side edges to the other; said arcuate grooves of said extension being substantially perpendicular to the shaft, said side edges being circumferentially spaced from said trough, the housing and the shaft being relatively rotatable to each other, said first ring member supported by the housing being relatively rotatable to said second ring member supported by the shaft, the relative rotation causing said arcuate extension to ward off profuse quantities of fluid directed at the shaft, said annular and arcuate grooves and said trough aiding to carry fluid thereat into the housing.*

33. The sealing ring of claim 32 wherein said first ring member between said annular recess and said outer face defines an annular flange that fits into an accommodating recess in said second ring member.

34. The sealing ring of claim 32 wherein the annular flange on the internal mating face of the second ring member includes two annular grooves along the outer periphery of the flange, said two annular grooves connected by an axial groove on the outer periphery of the flange.

* * * * *